UNITED STATES PATENT OFFICE 2,663,703

PURIFICATION OF STRAIGHT-CHAIN MONOHYDRIC ALCOHOLS

Robert A. Dinerstein, Chicago, Ill., assignor to Standard Oil Company, Chicago, Ill., a corporation of Indiana No Drawing. Application June 23, 1948,
Serial No. 34,825

13 Claims. (Cl. 260—96.5)

This invention relates to the purification of straight-chain monohydric alcohols. More particularly, it relates to the separation of straight-chain monohydric alcohols from mixtures of organic compounds comprised thereof.

The process of my invention is based on my discovery that straight-chain monohydric alcohols containing six or more carbon atoms in the molecule form solid urea adducts when contacted with urea in the presence of a polyhydric alcohol, whereas other organic compounds do not. Such adducts may conveniently be separated from the non-reactive organic materials, and the straight-chain monohydric alcohols may then be liberated therefrom in substantially purified condition.

One object of my invention is to purify straight-chain monohydric alcohols. Another object of my invention is to separate straight-chain monohydric alcohols from mixtures comprised thereof with other organic compounds. Special objects of my invention are to effect the separation of straight-chain monohydric alcohols from other alcohols and from straight-chain hydrocarbons. Other objects of my invention and its advantages over the prior art will be apparent from the following description and examples.

The prior art discloses that various classes of straight-chain organic compounds having six or more carbon atoms in the molecule form solid adducts when contacted with urea and an activator, such as water, methanol, ethanol, acetone, propionaldehyde, or the like. Among such classes of urea-reactive compounds are the straight-chain hydrocarbons, straight-chain alcohols, straight-chain aldehydes, straight-chain ketones, and the straight-chain aliphatic carboxylic acids and their ethyl esters. Until the present, however, no technique has been known whereby urea-adduct formation could be made selective for any one of the classes of urea reactive compounds. I have now discovered that urea reacts selectively with straight-chain monohydric alcohols if the urea is activated with a polyhydric alcohol, rather than with the activators disclosed in the prior art; and on the basis of this discovery I have devised a process for separating and purifying straight-chain monohydric alcohols from admixture with other organic compounds.

In my process, an organic charging stock containing one or more straight-chain monohydric alcohols is contacted with urea and a polyhydric alcohol at ordinary or elevated temperatures below 100° C., preferably between about 20 and 75° C., and at ordinary or elevated, preferably autogenous, pressure. Adduct formation takes place rapidly, and ordinarily reaches substantial completion in from about 0.1 to 1.0 hour. Thereafter, the reaction mixture is settled, centrifuged, or filtered to remove the solid adduct therefrom. The separated adduct is washed with an inert organic solvent, as hereinafter defined, and is then decomposed by a suitable procedure to release the straight-chain monohydric alcohol or alcohols therefrom.

I may, for example, decompose the adduct by dissolving it in a urea solvent, such as water, methanol, acetone, or the like, at a temperature above the melting point of the straight-chain monohydric alcohol or alcohols contained therein. I prefer to use water for this purpose, since the straight-chain monohydric alcohols separate readily from the resulting aqueous urea solution and form a distinct upper phase, which may conveniently be withdrawn. When urea solvents other than water are used, stratification may be induced by adding a quantity of water to the resulting solution, or the straight-chain monohydric alcohols may be separated from the solution by fractional distillation.

Alternatively, I may effect the decomposition of the adduct at an elevated temperature by adding thereto a urea solution having such a concentration that it is less than saturated with urea at the temperature employed, but which, after the decomposition has been effected, will deposit urea crystals on being cooled.

As a further refinement, I may decompose the washed adduct by heat alone. I have found that my adducts melt at approximately 100° C. and liberate the straight-chain monohydric alcohols as a separate phase, whereas the adducts obtained in the prior art melt at 125° C. or above. After separation of the straight-chain monohydric alcohol phase, the urea-polyhydric alcohol phase may be converted to a finely divided solid suitable for recycling. This may be accomplished simply by cooling to ordinary temperatures and pulverizing, or by spraying or atomizing the molten material into a stream of cold air or other gas, or by dissolving the mixture of urea and polyhydric alcohol in a suitable solvent, such as methanol or acetone, and spray-drying the resulting solution.

My process is useful broadly for treating charging stocks which contain a mixture of organic compounds including one or more straight-chain monohydric alcohols having six or more carbon atoms in the molecule, and for separating the straight-chain monohydric alcohol or alcohols partially or completely from the charging stock.

in pure form or in substantially purified condition. I have found that in the presence of polyhydric alcohols urea forms solid adducts with primary alkanols, including 1-hexanol, 1-heptanol, 1-octanol, 1-decanol, 1-tetradecanol, 1-octadecanol, and higher homologues; with primary alkenols, including 2-hexene-1-ol, 3-hexene-1-ol, 4-hexene-1-ol, 2-octene-1-ol, 8-decene-1-ol, 5-tetradecene-1-ol, 9-octadecene-1-ol, and the like; with secondary alkanols, such as 2-hexanol, 3-hexanol, 2-octanol, 2-nonanol, 5-nonanol, 3-tetradecanol, 3-octadecanol, and the like, including members of the series with the hydroxyl group located at other points on the carbon chain; and with secondary alkenols, such as 1-hexene-2-ol, 1-hexene-3-ol, 4-hexene-3-ol, 5-hexene-3-ol, 1-octene-3-ol, 2-octene-4-ol, 1-nonene-3-ol, 5-nonene-4-ol, 13-tetradecene-4-ol, and the like, including members of the series with the double bond and the hydroxyl group located at other points on the carbon chain. My process is especially advantageous for separating such alcohols from admixture with organic compounds, such as straight-chain hydrocarbons, aldehydes, ketones, and esters, which form solid adducts when contacted with urea in the presence of the types of activators employed in the prior art. It will be apparent, moreover, that my process may advantageously be employed to separate straight-chain monohydric alcohols from various other types of organic compounds, such as branched-chain and cyclic compounds in general, including tertiary alcohols, cycloaliphatic alcohols, phenols, branched-chain, naphthenic, and aromatic hydrocarbons, and from ethers, thioethers, mercaptans, disulfides, and the like, none of which form solid urea adducts under the conditions employed in my process.

My charging stock may advantageously be diluted with an organic liquid having substantially no reactivity with or solvency for urea, especially when the charging stock is a solid at the desired reaction temperature, or when it contains a high proportion of the urea-reactive group of alcohols, or when its viscosity is so high that difficulty would be encountered in effecting adequate contact between the undiluted charging stock and urea. A suitable diluent may be virtually any mobile liquid that does not form a urea adduct under the process conditions and does not react substantially with the charging stock. Among such diluents are the broad class of aliphatic hydrocarbons, such as pentane, hexane, decane, cetane, and the like, or preferably branched-chain aliphatic hydrocarbons such as isobutane, neopentane, neohexane, isooctane, and the like; cyclic hydrocarbons such as benzene, toluene, xylene, cyclopentane, methylcyclopentane, cyclohexane, and the like; aliphatic ethers such as ethyl ether, isopropyl ether, and the like; cyclic ethers such as tetrahydrofuran, pyran, and the like; and cyclic polyethers such as 1,4-dioxane and the like.

Inert organic diluent liquids of the above class may also be used satisfactorily for washing the urea adduct before it is decomposed to liberate the straight-chain monohydric alcohol constituent thereof. The washing may be carried out most effectively with liquids which tend also to remove the polyhydric alcohol from the adduct, such as for example, ethyl ether, tetrahydrofuran, 1,4-dioxane, and the like. Wash solvents of this type are capable of producing a clean, dry, powdery adduct from which the straight-chain monohydric alcohol may be regenerated in substantially pure form.

The urea is preferably used in the form of a finely divided powder, having a particle size, for example, between about 1 and 50 microns in order to facilitate contact and reaction with the charging stock. Alternatively, I may use the urea in the form of a saturated solution in a liquid polyhydric alcohol, or as a slurry in such a saturated solution, or as a slurry in an inert diluent liquid of the class disclosed above.

The quantity of urea should preferably be equivalent to at least about $(n-2):1$ moles per mole of straight-chain monohydric alcohol in the charging stock, where $n$ equals the average number of carbon atoms per molecule in the straight-chain monohydric alcohols, in order to effect substantially complete separation of straight-chain monohydric alcohols from the charging stock. It will be apparent, however, that I may use smaller proportions of urea if desired.

Polyhydric alcohols are broadly useful as the selective urea activator in my process. The selectivity of adduct formation is greatest with the aliphatic and cycloaliphatic polyhydric alcohols, including polyhydroxycycloalkanes such as quinitol, quercitol, inositol, and the like; polyhydroxyalkanes such sorbitol, mannitol, erythritol, glycerol, and the like; and polyhydric etheralcohols such as diethylene glycol, triethylene glycol, and the like. I ordinarily employ alkanediols as the urea-activator in my process, and I prefer to use water-miscible alkanediols, such as ethylene glycol, propylene glycol, trimethylene glycol, 1,2-butanediol, 1,3-butanediol, 2,3-butanediol, tetramethylene glycol, 2-methyl-2,4-pentanediol, and the like. It is to be understood that my class of polyhydric alcohols includes members of the broad class containing other functional groups which do not react with the various materials employed in my process, and which do not substantially alter the chemical and physical characteristics ordinarily associated with polyhydric alcohols.

The molar ratio of polyhydric alcohol to urea may suitably be between about 0.05:1 and 5:1, and is preferably between about 0.3:1 and 3:1.

My invention will be more fully understood from the following specific examples.

*Example I*

The following experiment illustrates the separation of 1-octanol from cetane (n-hexadecane). As the charging stock, an isooctane solution was prepared containing 30 percent by volume of an equimolar mixture of 1-octanol and cetane. A 150-milliliter portion of the charging stock was contacted for three hours at approximately 30° C. with 220 grams of urea and 110 grams of ethylene glycol, and the resulting slurry was filtered. The solid urea adduct was washed with isooctane, and was thereafter decomposed with an excess of water. The liberated organic phase, measuring 21 milliliters, was separated, and on analysis was found to contain 72 percent by volume of 1-octanol. Thus, 79 percent of the 1-octanol in the charging stock reacted with the urea, whereas only 19 percent of the cetane reacted.

For comparison, the above experiment was repeated, omitting the ethylene glycol. When the urea adduct was decomposed with water, the resulting organic phase measured 22 milliliters and contained 23 percent by volume of 1-octanol. Thus, in the absence of ethylene glycol, only 26 percent of the 1-octanol in the charging stock reacted with the urea, whereas 48 percent of the cetane reacted.

The following additional experiments were carried out to demonstrate the effectiveness of ethylene glycol in promoting the selective reaction of urea with 1-octanol:

When cetane as a 25 percent by volume solution in isooctane was agitated with urea alone for three hours at approximately 30° C., no urea adduct was formed.

When 23 grams of cetane were contacted for three hours at approximately 30° C. with 90 grams of urea and 180 grams of ethylene glycol, less than four percent of the cetane reacted with the urea.

When 500 milliliters of a 12 percent by volume cetane solution in isooctane were contacted for one hour at approximately 30° C. with 120 grams of urea and 62 grams of ethylene glycol, no adduct was formed. The mixture was heated to 65° C. and agitated for an additional hour; but again no adduct was formed.

When 70 milliliters of a 28 percent by volume solution of 1-octanol in isooctane were contacted for two hours at approximately 30° C. with 60 grams of urea, 21 percent of the 1-octanol was recovered from the washed urea complex.

*Example II*

The following experiment illustrates the separation of myristic alcohol from cetane. For the charging stock, an isooctane solution was prepared containing 15 percent by volume of an equimolar mixture of myristic alcohol and cetane. A 400-milliliter portion of the charging stock was contacted three hours at approximately 30° C. with 220 grams of urea and 110 grams of ethylene glycol. The resulting slurry was filtered, the filter cake was washed with isooctane, and the washed filter cake was decomposed with an excess of water. The resulting organic phase measured 9.3 grams, and on analysis was found to be substantially pure myristic alcohol. Thus, 40 percent of the myristic alcohol in the charging stock reacted with the urea, while none of the cetane reacted.

*Example III*

The following experiments on the reaction of urea with lauryl alcohol in the presence of ethylene glycol illustrate the formation, properties, and decomposition of a typical monohydric alcohol-urea-polyhydric alcohol adduct.

A 400-milliliter portion of an 18 percent by volume solution of lauryl alcohol in isooctane was contacted for three hours at approximately 30° C. with 120 grams of urea and 62 grams of ethylene glycol. The resulting urea adduct was washed 2 times with 200-milliliter portions of isooctane and was then decomposed with an excess of water. A lauryl alcohol phase measuring 31 milliliters was recovered, equivalent to 43 percent of the lauryl alcohol in the charging stock.

Another urea-glycol-lauryl alcohol adduct, prepared as described above, was washed with one 200-milliliter portion of ethyl ether, and from the wash liquid was recovered a quantity of lauryl alcohol equivalent to 3 percent of the lauryl alcohol in the charging stock. The adduct was subsequently washed with one 200-milliliter portion of 1,4-dioxane, and 8 percent of the original lauryl alcohol was recovered from the wash liquid. The washed adduct, which was by this time a dry powder showing no evidence of occluded liquid, was decomposed with an excess of water, and a quantity of lauryl alcohol corresponding to approximately 40 percent of the lauryl alcohol in the charging stock was recovered.

Another urea-glycol-lauryl alcohol adduct, prepared as described above, was heated and found to separate into two distinct phases at approximately 100° C.

For comparison with the urea-glycol adduct, a urea-methanol adduct was prepared by contacting 90 milliliters of a 15 percent by volume solution of lauryl alcohol in isooctane for one hour at approximately 30° C. with 40 grams of urea and 25 milliliters of methanol. The resulting adduct, after being washed with one 150-milliliter portion of 1,4-dioxane, was found to melt and stratify at approximately 125° C.

The above examples are illustrative only, and are not to be construed as limiting my invention to the specific charging stocks, manipulative steps, or process conditions described therein. It will be apparent that my process may be altered in numerous ways within the scope of the description and the appended claims, and it is to be understood that any modifications or equivalents that would ordinarily occur to those skilled in the art are to be considered as lying within the scope of my invention.

In accordance with the foregoing description, I claim as my invention:

1. In a process for separating a straight-chain monohydric alcohol having more than five carbon atoms in the molecule from a mixture comprised thereof with another urea-adduct-forming organic compound, other than an alcohol, the steps which comprise contacting said mixture with urea and a polyhydric alcohol, separating an adduct containing urea and said straight-chain monohydric alcohol, substantially free from said other organic compound, decomposing said adduct into urea and said straight-chain monohydric alcohol, and withdrawing said alcohol in purified form.

2. The process of claim 1 wherein said polyhydric alcohol is an aliphatic polyhydric alcohol.

3. The process of claim 2 wherein said aliphatic polyhydric alcohol is an alkanediol.

4. The process of claim 3 wherein said alkanediol is water-miscible.

5. The process of claim 4 wherein said alkanediol is ethylene glycol.

6. The process of claim 4 wherein said alkanediol is a propanediol.

7. The process of claim 4 wherein said alkanediol is a butanediol.

8. The process of claim 1 wherein polyhydric alcohol is a cycloaliphatic polyhydric alcohol.

9. In a process for separating a straight-chain monohydric alcohol having more than five carbon atoms in the molecule from a mixture comprised thereof with a straight-chain hydrocarbon having more than five carbon atoms in the molecule, the steps which comprise contacting said mixture with urea and a polyhydric alcohol, separating an adduct containing urea and said straight-chain monohydric alcohol, substantially free from said hydrocarbon, decomposing said adduct into urea and said straight-chain monohydric alcohol, and withdrawing said alcohol in purified form.

10. In a process for separating a straight-chain monohydric alcohol having more than five carbon atoms in the molecule from a mixture comprised thereof with a straight-chain hydrocarbon having more than five carbon atoms in the molecule, the steps which comprise contacting said mixture with urea and a water-miscible alkanediol, separating an adduct containing urea and said straight-chain monohydric alcohol, substantially free from said hydrocarbon, decomposing said adduct into urea and said straight-chain monohydric alcohol, and withdrawing said alcohol in purified form.

11. In a process for separating a straight-chain monohydric alcohol having more than five carbons atoms in the molecule from a mixture comprised thereof with a straight-chain hydrocarbon having more than five carbon atoms in the molecule, the steps which comprise contacting said mixture with urea and a water-miscible alkanediol, separating an adduct containing urea and said straight-chain monohydric alcohol, substantially free from said hydrocarbon, decomposing said adduct by treatment with a urea solvent at a temperature above the melting point of said straight-chain monohydric alcohol, whereby said straight-chain monohydric alcohol is liberated, and separating and withdrawing said straight-chain monohydric alcohol.

12. In a process for separating a straight-chain monohydric alcohol having more than five carbon atoms in the molecule from a mixture comprised thereof with a straight-chain hydrocarbon having more than five carbon atoms in the molecule, the steps which comprise contacting said mixture with urea and a water-miscible alkanediol, separating an adduct containing urea and said straight-chain monohydric alcohol, substantially free from said hydrocarbon, heating said adduct to a temperature above its melting point, whereby said straight-chain monohydric alcohol is liberated as a separate layer, and separating and withdrawing said straight-chain monohydric alcohol.

13. In a process for separating a straight-chain monohydric alcohol having more than five carbon atoms in the molecule from a mixture comprised thereof with a straight-chain hydrocarbon having more than five carbon atoms in the molecule, the steps which comprise contacting said mixture at a temperature between about 20 and 75° C. for a period in excess of around 0.1 hour with urea in a molar ratio of at least about $(n-1):1$, where $n$ is the number of carbon atoms in the molecule of said alcohol, and a water-miscible alkanediol in a molar ratio to said urea between about 0.05:1 and 5:1, separating from the reaction mixture an adduct of urea and said alcohol, substantially free from said hydrocarbon, decomposing said adduct into urea and said alcohol, and withdrawing said alcohol in purified form.

ROBERT A. DINERSTEIN.

References Cited in the file of this patent

UNITED STATES PATENTS

| Number | Name | Date |
|---|---|---|
| 1,830,859 | Schotte | Nov. 10, 1931 |
| 2,300,134 | Priewe | Oct. 27, 1942 |
| 2,360,685 | Jensen | Oct. 17, 1944 |
| 2,499,820 | Fetterly | Mar. 7, 1950 |
| 2,520,715 | Fetterly | Aug. 29, 1950 |

OTHER REFERENCES

Technical Oil Mission, Reel 143, 6 pages, translation of German patent application No. B190,197 (Bengen), deposited in the Library of Congress, May 22, 1946.